United States Patent
Baek (10) Patent No.: US 9,145,036 B2
(45) Date of Patent: Sep. 29, 2015

(54) SHOCK ABSORBER APPARATUS

(71) Applicant: Hyundai Motor Company, Seoul (KR)

(72) Inventor: Sang Ho Baek, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/829,441

(22) Filed: Mar. 14, 2013

(65) Prior Publication Data

US 2014/0175722 A1  Jun. 26, 2014

(30) Foreign Application Priority Data

Dec. 21, 2012  (KR) .................. 10-2012-0151141

(51) Int. Cl.
   *B60G 13/00*  (2006.01)
   *B60G 15/06*  (2006.01)
   *F16F 9/58*  (2006.01)

(52) U.S. Cl.
   CPC .............. *B60G 15/06* (2013.01); *B60G 15/065* (2013.01); *F16F 9/58* (2013.01); *B60G 2204/45021* (2013.01)

(58) Field of Classification Search
   CPC ................... B60G 2204/128; B60G 2202/152; B60G 17/04; B60G 15/14; B60G 2204/45021; B60G 15/06; B60G 15/065; F16F 9/0472; F16F 1/126; F16F 9/58; F16F 9/084
   USPC ............ 267/220, 33, 34, 35, 64.27, 122, 170, 267/178, 179, 219, 221, 286–294; 188/322.12; 280/124.151, 124.155, 280/124.179
   See application file for complete search history.

(56) References Cited

U.S. PATENT DOCUMENTS

| | | | | |
|---|---|---|---|---|
| 3,412,990 A * | 11/1968 | Gladstone | ...................... | 267/220 |
| 4,676,518 A * | 6/1987 | Kartchner et al. | ............ | 280/276 |
| 4,828,232 A * | 5/1989 | Harrod et al. | .............. | 267/64.24 |
| 4,969,542 A * | 11/1990 | Athmer et al. | ........... | 188/322.12 |
| 6,883,651 B2 * | 4/2005 | Fukaya | ..................... | 188/322.12 |
| 7,347,414 B2 * | 3/2008 | Groves | ......................... | 267/220 |
| 8,376,327 B2 * | 2/2013 | Lee et al. | ................... | 267/64.27 |

FOREIGN PATENT DOCUMENTS

| | | |
|---|---|---|
| JP | 2529730 B2 | 9/1996 |
| JP | 2005-106256 A | 4/2005 |
| JP | 2005-214359 A | 8/2005 |
| KR | 10-2004-0098473 A | 11/2004 |
| KR | 2006-0013326 A | 2/2006 |
| KR | 2006-0049930 A | 5/2006 |
| KR | 10-2006-0088635 | 8/2006 |
| KR | 10-2006-0088635 A | 8/2006 |
| KR | 10-0793248 B1 | 1/2008 |
| KR | 2008-0024366 A | 3/2008 |
| KR | 2009-0131977 A | 12/2009 |

* cited by examiner

*Primary Examiner* — Pamela Rodriguez
(74) *Attorney, Agent, or Firm* — Mintz Levin Cohn Ferris Glovsky and Popeo, P.C.; Peter F. Corless (57) ABSTRACT

The present disclosure provides a shock absorber apparatus that includes a bump stopper coupled to a piston rod of a shock absorber. A piston housing comes into contact with the bump stopper when the shock absorber is moved vertically. A support supports a spring surrounding the piston housing. An air cap extends from an upper end of the piston housing to the support so as to cover the piston housing and has an upper surface through which a piston rod passes, a side surface downwardly extending from an end of the upper surface, and an air channel through which compressed air of the bump stopper is guided and discharged to the support.

6 Claims, 8 Drawing Sheets

SHOCK ABSORBER APPARATUS

CROSS-REFERENCE TO RELATED APPLICATION

This application claims under 35 U.S.C. §119(a) the benefit of Korean Patent Application No. 10-2012-0151141, filed on Dec. 21, 2012 in the Korean Intellectual Property Office, the disclosure of which is incorporated herein in its entirety by reference.

BACKGROUND OF THE INVENTION

1. Field of the Invention

The present invention relates to a shock absorber apparatus, and more particularly, to a shock absorber apparatus that prevents foreign matter from being accumulated on the shock absorber.

2. Description of the Related Art

Generally, when a vehicle travels along a road, the vehicle shakes vertically due to the condition of the road or vibrations of the vehicle, so a shock absorber is included as part of the suspension system in order to ensure stable steering stability of a vehicle, as well as the comfort of a driver and passenger, with respect to external vibrations.

Figure 1:
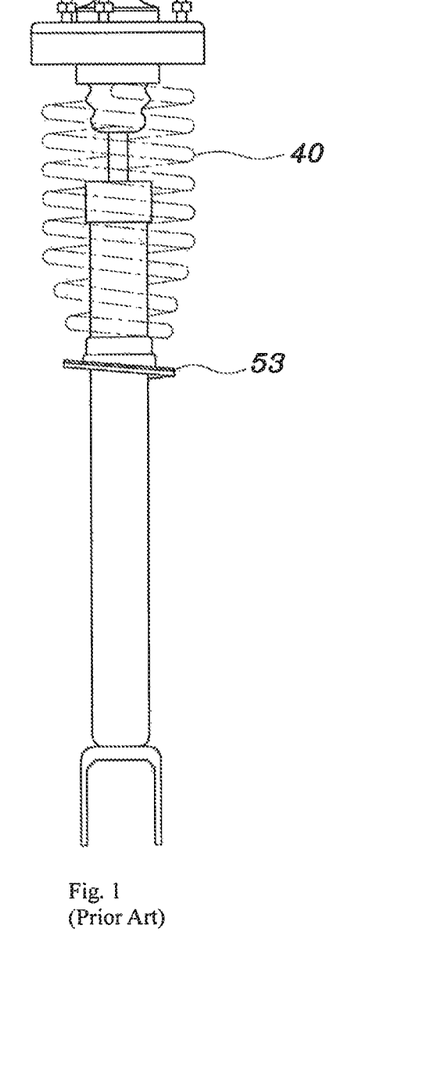
FIG. 1 is a conventional shock absorber apparatus.

FIG. 1 shows a conventional shock absorber which is coupled with a spring 40 so as to absorb shocks/impacts by applying reverse resistance against vertical vibrations of a vehicle. Here, when the shock absorber moves up and down, foreign matter such as dust, dirt, sand, etc. is introduced and accumulated into a lower pad 53, and repetitive vertical motions may damage the surface of the spring 40 and thus cause the spring to be broken.

It has been proposed to address the above-described problem with an oil-leak preventing device for a shock absorber assembly of a vehicle. In the device, a lift guide member is fixed onto a lower seat, and a reciprocating member is provided in order to connect the lift guide member and a piston, and an air jet member which communicates with the lift guide member and jets air along with a vertical motion of the reciprocating member is provided so as to discharge foreign matter from the shock absorber. Unfortunately, this conventional device has a significant problem in that the reciprocating member, the lift guide member, and the air jet member are separately mounted, rendering the structure to be complicated and causing a risk of breakage of individual components due to severe vibrations.

Thus, there is a need to provide a device for effectively removing foreign matter, which has a simple structure and does not use separate power, thus having no effect on fuel efficiency.

Furthermore, it should be noted that the description provided above is merely for aiding in understanding the background of the present invention, and should not be construed as admitted prior art.

SUMMARY OF THE INVENTION

Accordingly, the present invention has been made in an effort to solve the above problems occurring in the conventional art, and it is an object of the present invention to provide a shock absorber apparatus which effectively removes foreign matter from the shock absorber while having a simple structure as well as having no effect on a fuel efficiency because it does not use separate power.

In order to achieve the above object, according to one exemplary aspect of the present invention, there is provided a shock absorber apparatus including: a bump stopper coupled to an upper end of a piston rod of a shock absorber; a piston housing coming into contact with a lower surface of the bump stopper when the shock absorber is moved vertically; a support having a shape of a flange to surround the piston housing and supporting a lower end of a spring surrounding the piston housing; and an air cap having a shape of a cover extending from an upper end of the piston housing to the support so as to cover the piston housing and having an upper surface through which a piston rod passes, a side surface downwardly extending from an end of the upper surface, and an air channel through which compressed air of the bump stopper is guided and discharged to the support.

The support may have a lower seat supporting the spring, and a lower pad mitigating friction between the lower seat and the spring.

The upper surface of the air cap may have an inlet hole, a diameter of which is larger than a diameter of the piston rod, such that, when the bump stopper is compressed, air in the bump stopper is introduced into the air channel therethrough.

The upper surface of the air cap may have an inlet hole about which the plurality of air channels is radially separated in the air cap such that the air channels extend longitudinally from an upper end to a lower end of the air cap.

The air channel may have a bent section bent from the upper surface toward the side surface, the bent section having a gently curved corner to facilitate air flow.

The upper surface of the air cap may have an inlet hole corresponding to an air hole of the bump stopper. The air cap may be composed of a flexible material to resist an impact with the bump stopper.

According to the present invention, the shock absorber apparatus is applicable to all kinds of vehicles without a separate complex construction and device if the air cap is manufactured to correspond to an outer diameter of the piston housing, does not require separate further power in order to remove foreign matter, having no effect on fuel efficiency, can be used semi-permanently, and has a simple structure for easy manufacture and assembly, thus saving on cost.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Reference will now be made in greater detail to an exemplary embodiment of the invention, an example of which is illustrated in the accompanying drawings. Wherever possible, the same reference numerals will be used throughout the drawings and the description to refer to the same or like parts. While an air channel 650 can be formed in a variety of manners, a preferred embodiment thereof will be described.

Figure 2:
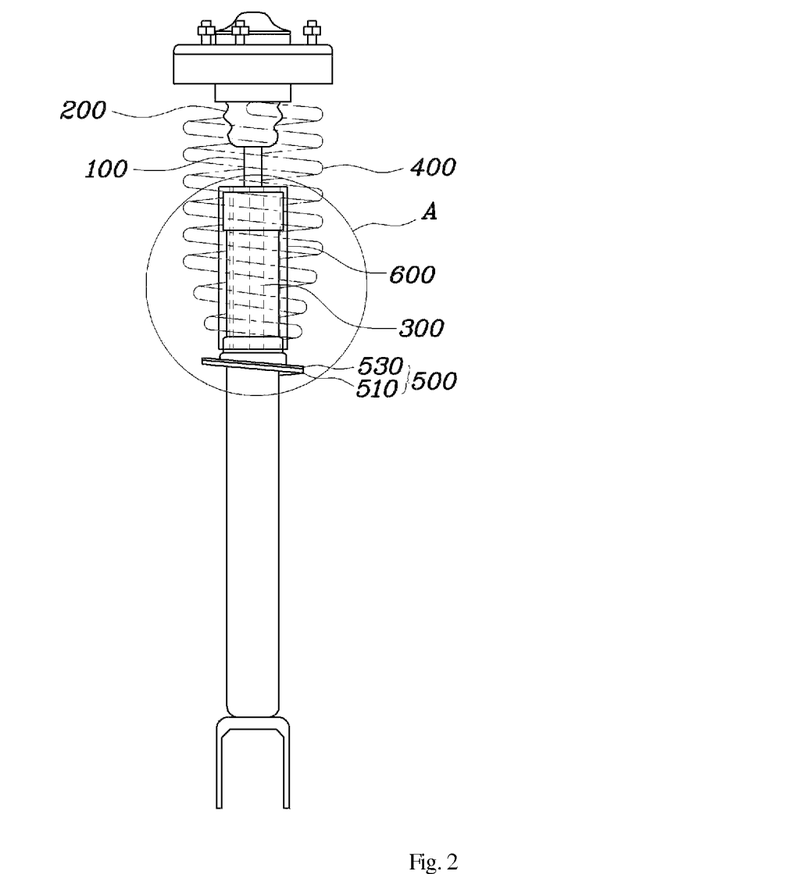
FIG. 2 is a view showing a shock absorber apparatus according to an exemplary embodiment of the present invention.
Figure 3:
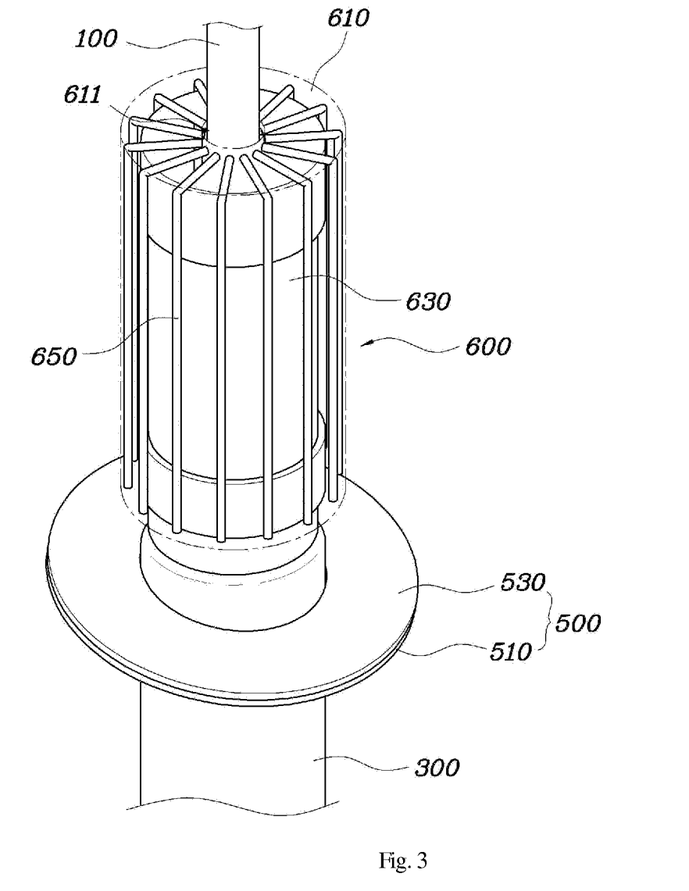
FIG. 3 is a detailed view of the section A of FIG. 2.

FIG. 2 is a view showing a shock absorber apparatus according to an embodiment of the present invention and FIG. 3 is a detailed view of section A of FIG. 2, wherein the shock absorber apparatus includes: a bump stopper 200 which is coupled to an upper end of a piston rod 100 of a shock absorber; a piston housing 300 which comes into contact with a lower surface of the bump stopper 200 when the shock absorber is moved vertically, a support 500 which has a shape of a flange to surround the piston housing 300 and which supports a lower end of a spring 400 which is mounted to surround the piston housing 300, and an air cap 600 which has a shape of a cover extending from an upper end of the piston housing 300 to the support 500 so as to cover the piston housing 300 and which has an upper surface 610 through which a piston rod 100 passes, a side surface 630 downwardly extending from an end of the upper surface 610, and an air channel 650 through which compressed air of the bump stopper is guided and discharged to the support 500.

The support 500 has a lower seat 510 which supports the spring 400, and a lower pad 530 which mitigates friction between the lower seat 510 and the spring 400, thereby serving to, when vibrations are generated in a vehicle, support the spring 400 such that it is not moved further downwards.

Figure 7:
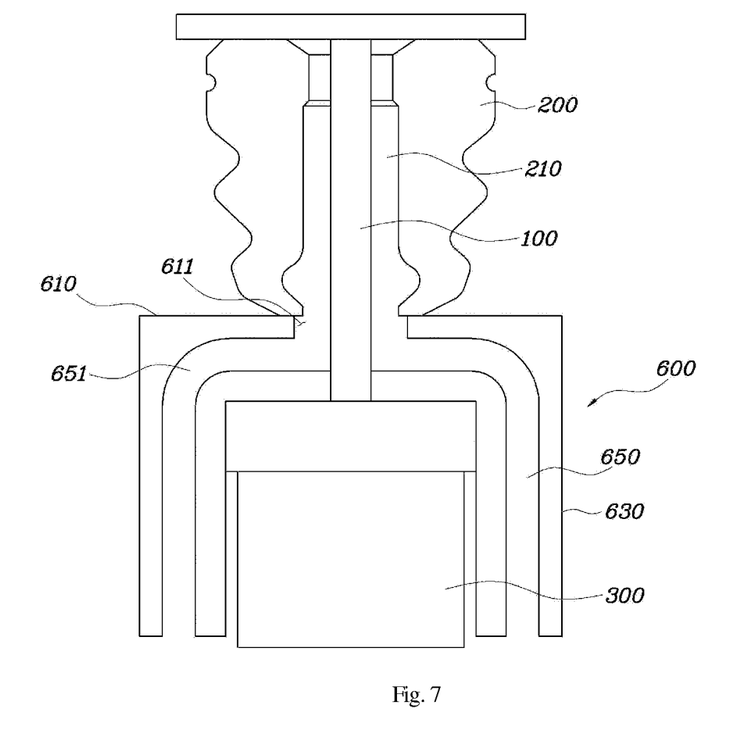
FIG. 7 is a cross-sectional view taken along line B-B of FIG. 5.

The bump stopper 200 is provided so that the piston rod 100 passes through the bump stopper, and has an air hole 210 at a position where the piston rod passes through the bump stopper (see, e.g., FIG. 7). The air hole has a diameter that is larger than a diameter of the piston rod 100. In a normal state, the bump stopper 200 is positioned above the piston housing 300 and does not come into contact with the piston housing 300. However, when a vehicle is vibrated and moved up and down, a lower surface of the bump stopper 200 and an upper surface of the piston housing 300 are brought into contact with each other, and if the vehicle is further vibrated, the bump stopper 200 is compressed against the upper surface of the piston housing 300, compressing air in the air hole 210 at the same time.

The upper surface 610 of the air cap 600 has an inlet hole 611 which is located corresponding to the air hole 210 of the bump stopper 200 and a diameter of which is larger than a diameter of the piston rod 100, such that, when the bump stopper 200 is compressed, compressed air in the bump stopper 200 is introduced into the air channel 650 therethrough.

The air channel 650 extends from the upper surface 610 to a lower end of the side surface 630 in the air cap 600, and consists of a plurality of air channels which are radially separated about the inlet hole 611, wherein each of the air channels extends from the upper surface 610 towards the side surface 630 is bent at a bent section 651, and longitudinally extends from the bent section 651 to the lower end of the side surface. Here, the upper surface 610 and the side surface 630 of the air cap 600 intersect with each other at a right angle, so the bent section 651 may also be bent at a right angle. However, for easy flowing of air, the bent section may have a gently curved corner.

Thus, in operation, compressed air in the air hole 210 of the bump stopper 200 is introduced through the inlet hole 611 of the upper surface 610 of the air cap 600 to the support 500 along the air channels 650 extending from the upper surface 610 to the lower end of the side surface, so as to remove foreign matter accumulated on the lower pad 530 of the support 500 using the force of the compressed air. The air cap 600 is composed of a flexible material to resist an impact with the bump stopper 200.

Figure 4:
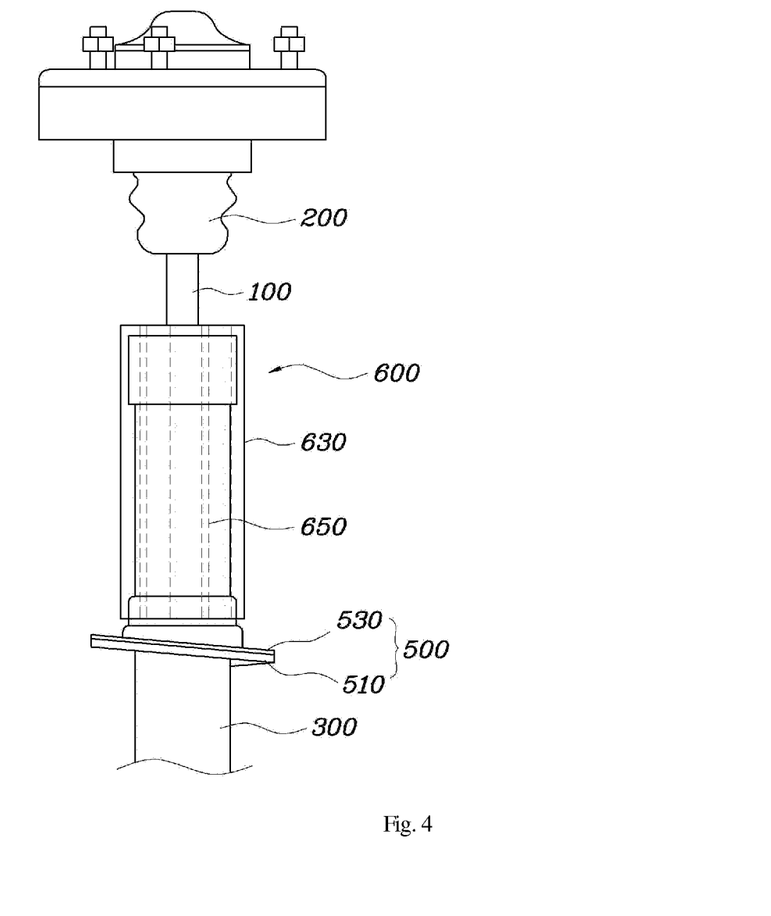
FIG. 4 is a view of the shock absorber apparatus in a normal state.
Figure 5:
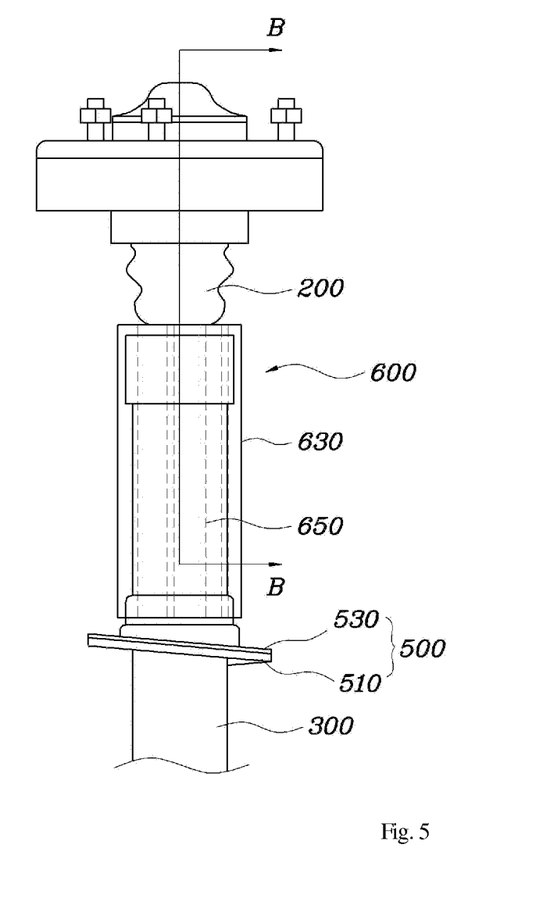
FIG. 5 is a view of the shock absorber apparatus in which a bump stopper is in a contact state.
Figure 6:
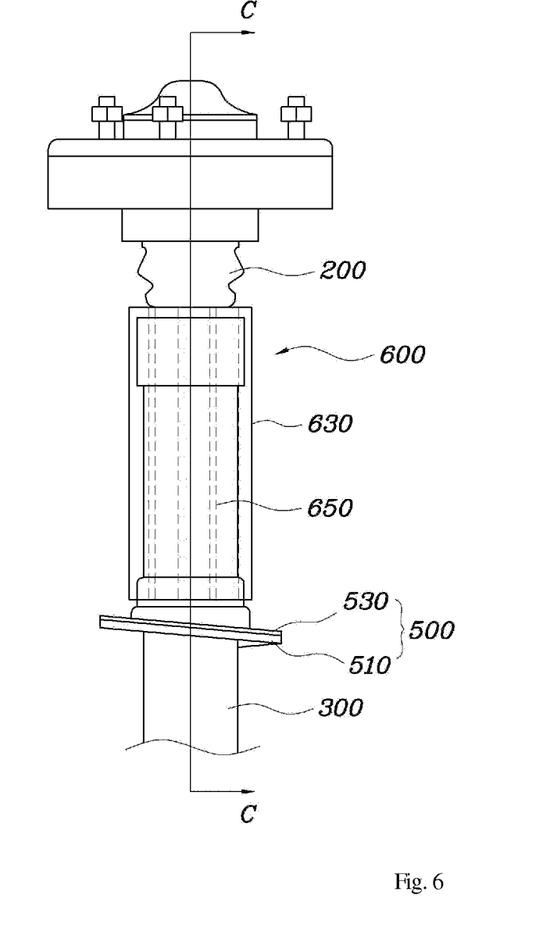
FIG. 6 is a view of the shock absorber apparatus in which the bump stopper is in a compressed state.

FIGS. 4 to 6 are views of the bump stopper 200 and the air cap 600, showing the degree of contact therebetween, wherein FIG. 4 is a view of the shock absorber apparatus in a normal state, FIG. 5 is a view of the shock absorber apparatus in which the bump stopper 200 is in a contact state, and FIG. 6 is a view of the shock absorber apparatus in which the bump stopper 200 is in a compressed state.

Figure 8:
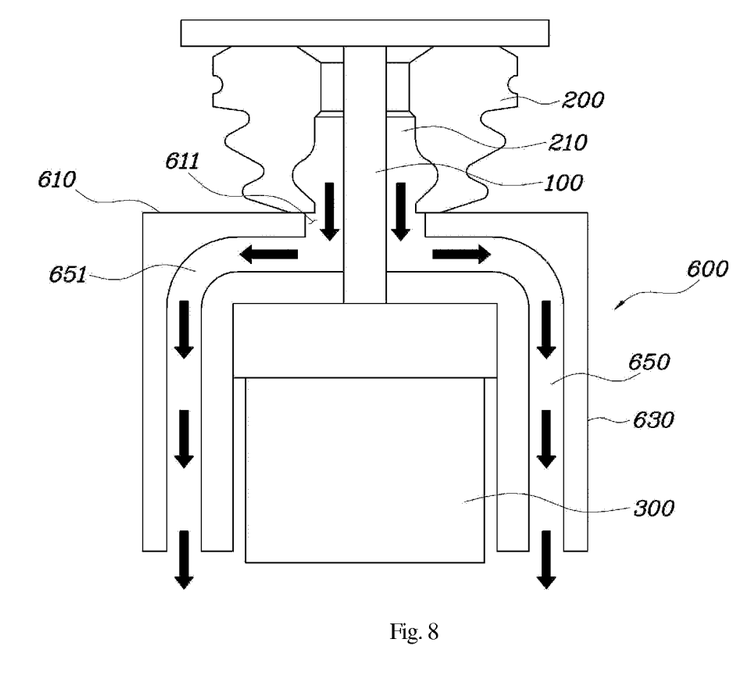
FIG. 8 is a cross-sectional view taken along line C-C of FIG. 6.

FIG. 7 is a cross-sectional view taken along line B-B of FIG. 5, showing the state of the bump stopper 200 and the air cap 600 being brought into contact with one another, and FIG. 8 is a cross-sectional view taken along line C-C of FIG. 6, showing the state of the bump stopper 200 being compressed so as to cause the compressed air to flow in the direction of the arrow. As shown in the figures, the compressed air in the air hole 210 of the bump stopper 200 is introduced through the inlet hole 611 of the upper surface 610 of the air cap 600 to the support 500 along the air channels 650 in the air cap 600, so as to remove foreign matter that has accumulated in the support 500.

According to an exemplary embodiment of the present invention, the shock absorber apparatus is applicable to all kinds of vehicles without a requirement for a separate, vehicle specific, complex construction. Additionally, the shock absorber apparatus does not require separate power in order to remove foreign matter, and has no effect on fuel efficiency. Furthermore, it can be used semi-permanently, and has a simple structure for easy manufacture and assembly, thus saving on cost.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A shock absorber apparatus, comprising:
   a bump stopper coupled to an upper end of a piston rod of a shock absorber;
   a piston housing configured to come into contact with a lower surface of the bump stopper when the shock absorber is moved vertically;
   a support having a shape of a flange to surround the piston housing and supporting a lower end of a spring surrounding the piston housing; and
   an air cap having a shape of a cover extending from an upper end of the piston housing to the support so as to cover the piston housing and having
   an upper surface through which the piston rod passes,
   a side surface downwardly extending from an end of the upper surface, and
   an air channel through which compressed air of the bump stopper is guided and discharged to the support,
   wherein the upper surface of the air cap has an inlet hole, a diameter of which is larger than a diameter of the piston rod, such that, when the bump stopper is compressed, air in the bump stopper is introduced into the air channel therethrough, and
   wherein the air channel extends longitudinally from an upper end to a lower end of the air cap.

2. The shock absorber apparatus according to claim 1, wherein the support has a lower seat supporting the spring, and a lower pad mitigating friction between the lower seat and the spring.

3. The shock absorber apparatus according to claim 1, wherein a plurality of air channels are radially separated in the air cap about the inlet hole.

4. The shock absorber apparatus according to claim 1, wherein the air channel has a bent section bent from the upper surface toward the side surface, the bent section having a gently curved corner to facilitate air flow.

5. The shock absorber apparatus according to claim 1, wherein the upper surface of the air cap has the inlet hole corresponding to an air hole of the bump stopper.

6. The shock absorber apparatus according to claim 1, wherein the air cap is composed of a flexible material to resist an impact with the bump stopper.

* * * * *